April 23, 1957 R. V. HUTCHINSON 2,789,438
IDLER MECHANISM
Filed Aug. 12, 1953
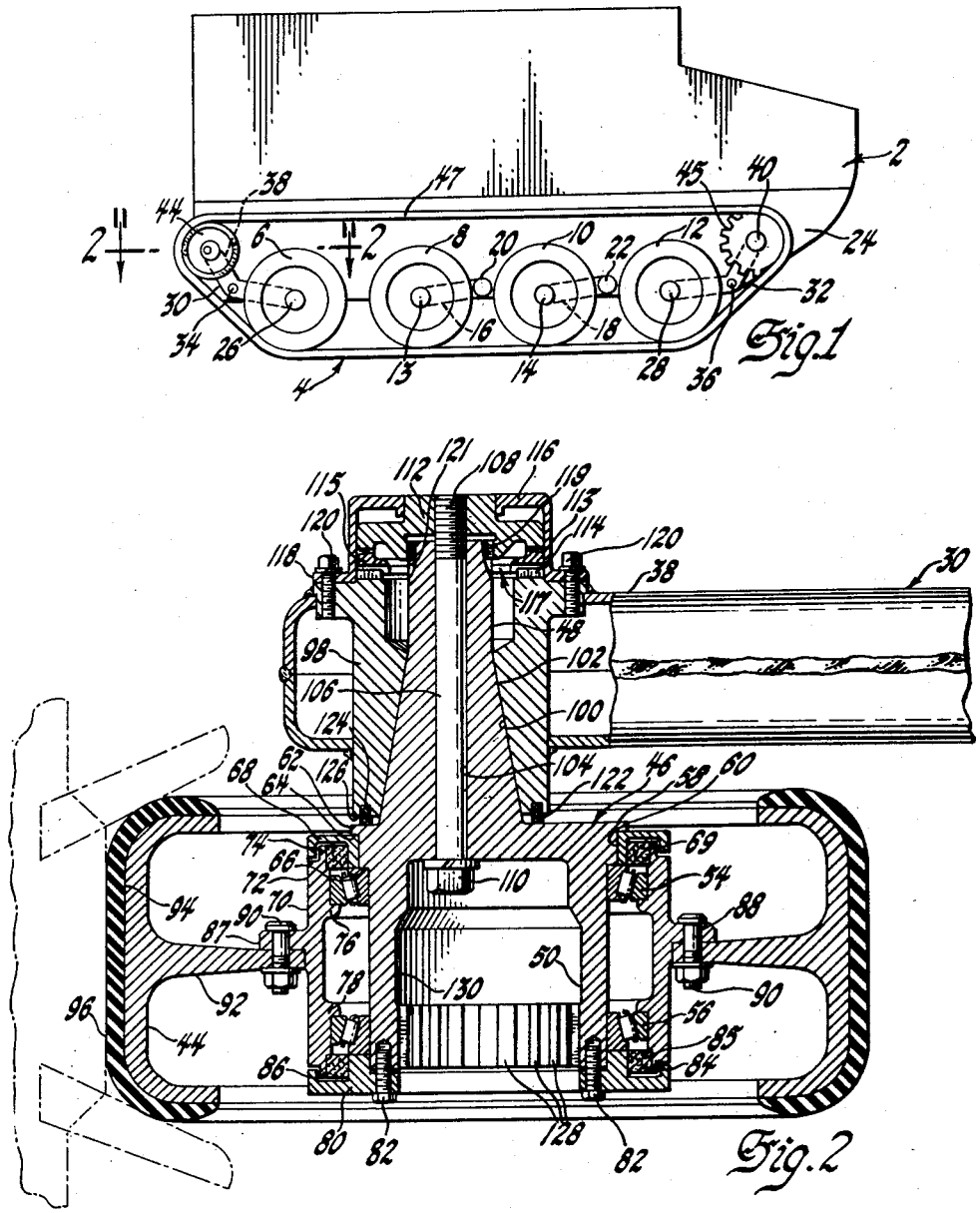
INVENTOR
Roland V. Hutchinson
BY
ATTORNEY

2,789,438

IDLER MECHANISM

Roland V. Hutchinson, Birmingham, Mich., assignor to General Motors Corporation, Detroit, Mich., a corporation of Delaware Application August 12, 1953, Serial No. 373,723

7 Claims. (Cl. 74—242.1)

This invention relates to idler mechanisms and more particularly, although not exclusively, to adjustable idler mechanisms for track laying vehicles.

It is well known in the art to provide idler wheels adapted for maintaining the tracks of tracked vehicles in substantially constant tension irrespective of momentary elevational changes of any of the track wheels. In one form of track laying undercarriages, a plurality of track wheels are mounted on independently sprung longitudinal levers. The forward and rearward levers have two generally oppositely extending arm portions, a wheel being mounted on one arm and a transmission drive gear or a track idler wheel being mounted on the other arm. When arranged in this manner, the idler wheel or transmission drive gear and its companion track wheel pivot about a common axis. Consequently, the distance between the idler wheel and track wheel remains constant, irrespective of rise and fall of the wheel. Thus the original tension of the track remains constant for all variations in elevation of the individual track wheels, or for concerted rise and fall of all the wheels. However, with a track laying undercarriage of this type, it is necessary that the axis of rotation of the idler wheel be adjustable fore and aft through a reasonable range to provide desired initial track tension as well as for subsequent periodic field adjustments.

In the prior art, various devices have been utilized to linearly displace the axis of rotation of the idler wheel for such track adjustment. However, in general, such devices have been relatively inaccessible and difficult to adjust, particularly under field conditions.

It is an object of the present invention to provide a readily adjustable idler for a track laying vehicle of the type having a track compensating undercarriage.

Another object is to provide a device of the type described having means responsive to rotation for linearly shifting the axis of rotation of the idler.

Still another object is to provide a device of the type described having simplified means for accomplishing adjustment.

A further object of the invention is to provide a device of the stated character which is easily and positively secured in an adjusted position and which is easily readjustable.

These and other objects and advantages of the invention will become apparent from the following description, reference being made to the drawings wherein:

Fig. 1 is a schematic side elevational view of a track laying vehicle showing the general arrangement of the track-laying undercarriage and the relation of the idler wheel thereto; and Fig. 2 is an enlarged fragmentary plan view, partly in section, showing the construction and arrangement of the idler wheel and the adjustment therefor.

Referring now to the drawings and particularly Fig. 1, there is shown schematically a track-laying vehicle 2 which is provided with a track-laying undercarriage 4 comprising a plurality of track wheels 6, 8, 10 and 12. Intermediate wheels 8 and 10 are rotatably secured at one end 13 and 14 of longitudinal levers 16 and 18. The opposite ends 20 and 22 of levers 16 and 18 are in turn rotatably secured to chassis 24 and cooperate with suitable resilient means, not shown, to yieldably resist rise and fall of wheels 8 and 10. Track wheels 6 and 12 are rotatably mounted at one end 26 and 28 of generally L-shaped longitudinal levers 30 and 32. Levers 30 and 32 are rotatably supported at their midportions 34 and 36 on the chassis 24 and cooperate with resilient means in the same manner as levers 16 and 18. At their opposite upwardly inclined ends 38 and 40, levers 30 and 32 are provided with means for rotatably supporting an idler wheel 44 and a transmission drive gear 45, respectively. A vehicle track 47, of the link type, is disposed over the track wheels, transmission drive gear and idler wheel to form an endless belt having meshing engagement with the drive gear 45, and tangential engagement with the track wheels 6, 8, 10 and 12 and idler wheel 44. Since the track 47 forms no part of the present invention, no further description of the construction will be given, it being understood that any of the conventional types may be employed.

With a track-laying undercarriage of the type referred to, it will be apparent that during progress of the vehicle over irregular terrain, vertical displacement of the track wheels, separately or simultaneously, does not require a device for momentarily taking up track slack, since the coincidentally mounted idler wheel 44 and track wheel 6 and drive gear 45 and track wheels 12, respectively, assure constant track tension. By way of example, when track wheel 6 rises or passes over a bump, the extent of rise of wheel 6 is exactly counteracted by an equal downward movement of the idler wheel 44, thereby maintaining the normal perimetal length defined by the track wheel 6 and idler 44 in the normal position. Since the transmission drive gear 45 and the front track wheel 12 are similarly coincidentally supported at opposite ends of the forward suspension arm 32, a similar result occurs when the forward track wheel 12 passes over a bump.

To secure, initially, the desired track tension, idler wheel 44 is rotatably mounted on a linearly adjustable idler wheel support mechanism 46, which is in turn secured to the end portion 38 of lever 30 in a manner to be described presently. As seen best in Fig. 2, support mechanism 46 comprises a stub shaft 48 having an integral offset cylindrical bearing support portion 50. Spaced apart axially on support 50 are bearings 54 and 56 which in turn rotatably support idler wheel hub portion 70. Bearings 54 and 56 may be of any conventional type, the roller type being shown for the purposes of illustration only. Axially inwardly from bearing 54 is a suitable grease seal 69, which is also of the conventional type. To secure the hub 70 against axial shifting, a cover member 80 is disposed over the outer face of bearing support portion 50 and is secured thereon by a plurality of cap screws 82. A circumferential groove 84 formed in cover member 80 carries a second grease seal 85 generally similar to seal 69. To secure idler wheel 44 to hub 70, a central circular flange 87, formed on the outer periphery of hub 70, is provided with a plurality of apertures 88 adapted to receive bolts 90, which in turn extend through a central inner flange 92 formed on idler wheel 44. To assure silent operation, a resilient track engaging portion 96 is bonded to the outer periphery 94 of idler wheel 44.

To provide for linear adjustment of idler wheel 44, in accordance with the present invention, the tapered stub shaft 48 is machined on an axis eccentric to the axis of bearing support portion 50. A mounting bracket or fixed bushing member 98, secured in the end portion 38 of lever 30, is formed with a tapered bore 100 corresponding with and adapted to receive the tapered portion 102 of the stub shaft 48. It should be noted that the degree of taper of bore 100 and tapered portion 102 is preferably sufficiently large to provide non-freezing frictional engagement so that the parts may be easily adjusted relative to each other. The mounting bracket or bushing 98 may be attached to lever 30 by any suitable means, as for instance, by welding. In order to assure positive and uniform engagement between tapered portion 102 of stub shaft 48 and the internal tapered bore 100 of bushing 98, stub shaft 48 is provided with a straight axial bore 104 adapted to receive a locking bolt 106 which is threaded at one end 108 and provided with a hexagonal head 110 at its opposite end. Threaded portion 108 of bolt 106 is adapted to threadably engage a circular nut 112. Nut 112 is disposed in axial alignment with the mounting bracket or bushing 98 and is provided with radial face splines 113 adapted to cooperate with similar face splines 115 formed on a circular block 117, which is in turn keyed to the mounting bracket or bushing 98 by integral tabs 114 formed thereon. Nut 112 is also provided with a splined counterbore 119 adapted to cooperate with the splined terminal portion 121 of shaft 48 to permit free axial movement of nut 112 when bolt 106 is loosened. It will be apparent that upon loosening bolt 106, rotation of shaft 48 will be accompanied by similar rotation of nut 112. Conversely, when bolt 106 is drawn up, nut 112 will be drawn inwardly against block 117, causing radial splines 113 to register with radial splines 115. Shaft 48 will thus be rigidly secured against rotation in bushing 98. A generally cup-shaped member 116 surrounds nut 112 and is provided with an outwardly flared flange 118 through which extend a plurality of cap screws 120 for threaded engagement with bushing 98. Cup-shaped member 116 assures axial alignment of nut 112 and block 117 while allowing sufficient axial movement of nut 112 to permit disengagement of the splined faces 113 from splined faces 115 when bolt 106 is loosened. In addition, cup-shaped member 116 serves to exclude dust and dirt from the interior of bushing 98, thereby preventing scoring or possible damage to tapered bore 100 and the tapered portion 102 of shaft 48. To exclude dust from the forward portion of bushing 98, a flexible washer 122 is positioned in a circumferential groove 124 formed in the front face 126 of bushing 98 and compressibly engages the rear face of bearing support portion 50 when bolt 106 is tightened.

In order to linearly shift the axis of rotation of the idler wheel 44, it is only necessary to loosen bolt 106 to axially displace nut 112 sufficiently to allow radial face splines 113 to ratchet over radial face splines 115. When bolt 106 is thus loosened, tapered surfaces 102 and 100 of stub shaft 48 and bushing 98 automatically separate because of the self-releasing degree of taper. Subsequently, the entire idler wheel support mechanism 46 may be rotated either clockwise or counter-clockwise by the insertion of a suitable wrench, not shown, into the internal splines 128 formed near the outer end of the bore 130 of support portion 50. Since support portion 50 is generated about an axis eccentric to the axis of the stub shaft 48, rotation of the stub shaft about its fixed axis linearly shifts the effective axis of bearings 54 and 56. By virtue of the large diameter of the splined portion 128, both the splined adjusting wrench and the locking bolt wrench necessary to perform the adjustment operation may be placed in position simultaneously, thereby increasing convenience of adjustment.

It should also be observed that the construction and arrangement of the present invention provides the maximum accessibility for adjustment or readjustment of the idler wheel position, since both the adjusting splines and the locking bolt hexagon head 110 face outwardly from the side of the vehicle.

From the foregoing it will be seen that a novel and highly efficient adjusting mechanism has been provided wherein difficulty of accessibility has been completely eliminated. In addition, the device permits simultaneous control of both the adjusting and locking members thereby permitting rapid and convenient field adjustment.

While but a single embodiment has been shown and described, it is to be understood that other modifications may be adopted without departing from the scope of the invention. Therefore, it is not intended to limit the invention to the single embodiment shown but only by the scope of the claims which follow.

I claim:

1. An idler mechanism comprising a cylindrical bearing support having an integral axially directed eccentric tapered portion, a mounting bracket for said support having a tapered bore formed therein for non-freezing engagement with said eccentric tapered portion, means for selectively locking said tapered portion rigidly in one of a plurality of angular positions in said bore, said locking means comprising an elongated threaded bolt carried axially in said tapered portion, a splined nut axially adjustable on said bolt, and a splined block secured to said bracket to preclude angular relative movement therebetween, the splines of said nut and block being engageable upon axial adjustment of the former to lock said tapered portion relative to said bracket, spaced bearings disposed on said cylindrical support, an idler wheel mounted for rotation on said bearings, and means formed interiorly of said cylindrical support and engageable by a tool to rotate said bearing support upon release of said locking means.

2. An idler mechanism comprising a cylindrical bearing support open at one end and having an integral axially directed tapered portion formed eccentrically thereto, a mounting bracket for said support having a tapered aperture formed therein for non-freezing engagement with said axially directed tapered portion, means disposed axially of said tapered portion for selectively rigidly securing said tapered portion in one of a plurality of angular positions in said tapered aperture, spaced bearings disposed on said cylindrical support, an idler wheel rotatably mounted on said bearings, and means disposed interiorly of said cylindrical support and engageable by a tool to rotate said bearing support upon release of said securing means, said securing means and rotatable means being simultaneously accessible through said open end of said support for contemporaneous operation.

3. An idler mechanism comprising a cylindrical bearing support having an integral tapered stub shaft, said support and said stub shaft having eccentric axes, a mounting bracket for said support having a tapered bore formed therein for non-freezing engagement with said stub shaft, relatively movable threadably interconnected means carried by said stub shaft and cylindrical support to adjustably secure said shaft against rotation in said bore, seal means on said bracket engaging said support, a plurality of bearings disposed on said cylindrical support, an idler wheel rotatably mounted on said bearings, and a splined socket formed in said cylindrical support and engageable by a tool to rotate said support upon release of said threaded means, said threaded means being simultaneously accessible with said splined socket through the latter.

4. An idler mechanism comprising a cylindrical bearing support open at one end and having an integral axially directed tapered portion, the effective axis of said support being eccentric to the effective axis of said tapered portion, a mounting bracket for said mechanism having a tapered bore formed therein for mating non-freezing engagement with said tapered portion, means for adjustably securing said tapered portion rigidly in one of a plurality of angular positions in said bore, spaced bearings disposed on said cylindrical support, an idler wheel mounted for rotation on said bearings, and serrated means disposed interiorly of said cylindrical support at its open end and engageable by a tool to rotate said support upon release of said adjustable means, said adjustable means and said serrated means being in general alignment, the former being accessible through the latter at the open end of the support.

5. In a track-laying vehicle, an idler mechanism comprising an idler wheel mounted for rotation on a bearing support having an integral eccentric stub shaft, serrated mounting means receiving said stub shaft, the axis of rotation of said wheel being shiftable in response to rotation of said stub shaft in said mounting means, serrated means splined to said stub shaft and axially movable thereon relative to said mounting means to selectively engage the serrations on the latter, threaded means on said stub shaft axially adjustably secured to said serrated means for movement of the latter relative to said mounting means to rigidly secure said stub shaft in one of a plurality of angular positions in said mounting means, and internal splines on said bearing support engageable by a tool to rotate said stub shaft upon release of said serrated means.

6. An idler mechanism comprising an idler wheel, a support for said wheel, an off-set tapered stub shaft integral with said support, a splined projection on said stub shaft, a bracket having a tapered bore for sleeved engagement with said stub shaft, a first member axially shiftable on said splined projection, said member having radial face splines, a second member secured against rotation to said bracket, said second member having face splines for selective engagement with said first shiftable member, and means carried by said stub shaft and adjustably secured to said first member to axially shift the latter into engagement with said second member to rigidly lock said stub shaft in one of a plurality of fixed angular positions relative to said bracket.

7. An idler mechanism comprising a bearing support, a tapered stub shaft integral with said support and eccentric thereto, mounting means frictionally engaging and receiving said stub shaft, means adjustably securing said stub shaft in one of a plurality of angular positions relative to said mounting means, said means comprising a first member splined to and axially shiftable on said stub shaft into and out of engagement with said mounting means to permit angular adjustment of said stub shaft relative to said mounting means, and a second member carried by said stub shaft and threadably engaging said axially shiftable member to selectively shift the latter.

References Cited in the file of this patent

UNITED STATES PATENTS

| | | |
|---|---|---|
| 1,171,347 | Morse | Feb. 8, 1916 |
| 2,393,993 | Knox | Feb. 5, 1946 |
| 2,430,136 | Nilsson | Nov. 4, 1947 |
| 2,526,242 | LaSalle | Oct. 17, 1950 |
| 2,655,678 | Keogh | Oct. 20, 1953 |

FOREIGN PATENTS

| | | |
|---|---|---|
| 21,291 | Great Britain | of 1914 |